(12) United States Patent
Joo

(10) Patent No.: US 9,197,021 B2
(45) Date of Patent: Nov. 24, 2015

(54) MICRO SIM CARD SOCKET

(75) Inventor: Sung Hyuk Joo, Ansan (KR)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 13/820,546

(22) PCT Filed: Sep. 2, 2011

(86) PCT No.: PCT/KR2011/006526
§ 371 (c)(1),
(2), (4) Date: May 9, 2013

(87) PCT Pub. No.: WO2012/030191
PCT Pub. Date: Mar. 8, 2012

(65) Prior Publication Data
US 2013/0224982 A1    Aug. 29, 2013

(30) Foreign Application Priority Data
Sep. 2, 2010 (KR) .......................... 10-2010-0085856

(51) Int. Cl.
| H01R 12/50 | (2011.01) |
| G06K 7/00 | (2006.01) |
| H01R 13/629 | (2006.01) |
| H01R 13/658 | (2011.01) |
| G06K 13/08 | (2006.01) |
| H01R 12/71 | (2011.01) |

(52) U.S. Cl.
CPC ............ *H01R 23/7005* (2013.01); *G06K 7/003* (2013.01); *G06K 13/085* (2013.01); *G06K 13/0825* (2013.01); *G06K 13/0837* (2013.01); *H01R 13/629* (2013.01); *H01R 13/658* (2013.01); *H01R 23/7068* (2013.01); *H01R 12/714* (2013.01)

(58) Field of Classification Search
USPC .......................... 439/345, 346, 159, 325, 630
See application file for complete search history.

(56) References Cited

U.S. PATENT DOCUMENTS

| 7,207,814 B2 * | 4/2007 | Chen et al. ..................... 439/159 |
| 7,261,578 B2 * | 8/2007 | Zhao .............................. 439/188 |
| 7,309,245 B2 * | 12/2007 | Sadatoku et al. .............. 439/159 |
| 7,438,599 B2 * | 10/2008 | Uchida et al. .................. 439/630 |
| 7,510,415 B2 * | 3/2009 | Wang ............................. 439/159 |
| 7,811,106 B2 * | 10/2010 | Lin et al. ....................... 439/159 |
| 7,927,115 B2 * | 4/2011 | Sun ............................... 439/159 |
| 7,950,945 B2 * | 5/2011 | Ahn .............................. 439/325 |
| 8,608,494 B2 * | 12/2013 | Yang ............................. 439/159 |
| 2001/0055897 A1 * | 12/2001 | Nogami ........................ 439/159 |

(Continued)

FOREIGN PATENT DOCUMENTS

| KR | 10-0729811 B1 | 6/2007 |
| KR | 10-0755281 B1 | 9/2007 |
| KR | 10-2009-0129894 A | 12/2009 |

OTHER PUBLICATIONS

International Search Report for PCT/KR2011/006526.

*Primary Examiner* — Alexander Gilman

(57) ABSTRACT

The micro SIM card socket of the Present Disclosure, by manufacturing the contact terminals in a "U" shape, can resolve the problem of narrowing contact terminal installation space due to miniaturization trends, and also the problem of collision between the card front end and the contact terminals when a card is inserted; it can effectively prevent the malfunction or poor contact that can occur due to the inability of the contact terminals to firmly contact the connection terminals of the SIM card when the SIM card is inserted.

9 Claims, 5 Drawing Sheets

(56) References Cited

U.S. PATENT DOCUMENTS

2008/0026619 A1* 1/2008 Chang .................... 439/159
2009/0227149 A1* 9/2009 Ma et al. ................ 439/658
2012/0252240 A1* 10/2012 Yang ..................... 439/159
2013/0224982 A1* 8/2013 Joo ....................... 439/345
2013/0231001 A1* 9/2013 Joo ....................... 439/345
2014/0199875 A1* 7/2014 Choi et al. .............. 439/346

* cited by examiner

MICRO SIM CARD SOCKET

REFERENCE TO RELATED APPLICATIONS

The Present Disclosure is a United States National Phase Application of PCT Patent Application No. PCT/KR2011/0006526, entitled "Micro SIM Card Socket," filed on 2 Sep. 2011 with the Korean Intellectual Property Office (KIPO). Further, the Present Disclosure claims priority to prior-filed Korean Patent Application No. 10-2010-0085856, entitled "Micro SIM Card Socket," filed on 2 Sep. 2010 also with the KIPO. The content of the aforementioned Patent Application is incorporated in its entirety herein.

BACKGROUND OF THE PRESENT DISCLOSURE

The Present Disclosure relates, generally, to a micro SIM card socket, and more specifically to a micro SIM card socket with improved contact terminal shape, thus enabling micro-miniaturized and ultraslim configurations.

In general, a Subscriber Identification Module (SIM) is a chip on which the diverse personal information of the subscriber is stored, such as a telephone number. If this chip is connected to a Code Division Multiple Access (CDMA) terminal for international roaming, then regardless of the technical specification of the mobile phone, e.g., CDMA or GSM, it enables mobile telephony to be used freely in any region, with the subscriber's own telephone number. To obtain international roaming service using a SIM card, the SIM card is inserted directly into the socket (connector) onboard the terminal (mobile phone) for use.

A conventional micro SIM card socket is furnished with an insulative housing wherein the SIM card is mounted. A metal shell guides the insertion of the SIM card by coupling with the housing while maintaining a fixed interval therefrom. A plurality of contact terminals are supported on the housing and contact the connection terminals of the SIM card on one side and are fixed to a printed circuit board on the other side. A SIM card recognition terminal is supported on the housing in order to recognize the insertion of the SIM card. A locking part is installed on the side of the housing to selectively fix the insertion location of the SIM card.

However, in conventional micro SIM card sockets, with the miniaturization of apparatus including terminals, the SIM cards mounted within the apparatus is also being miniaturized, and consequently the sockets are also being miniaturized, so that the space in which the contact terminals can be safely installed within the housing is becoming very narrow. Additionally, there is a risk of collision between the front end of the card and the contact terminals during insertion. Also, due to the inadequate escape zone, there are limits to the extent to which an ultraslim configuration can be achieved.

Considering the problem of collision with the contact terminals at the time of micro SIM card insertion, referring to FIGS. 1-3, first, as shown in FIG. 1, there is a risk of collision between the front end of the micro SIM card 1 and the contact terminal 12, and as shown in FIG. 2, collision with the front end of the micro SIM card 1 must be prevented by slightly lengthening the front end of the contact terminal 12. However, as shown in FIG. 3, after contact with the micro SIM card 1, there is the problem of the edge of the contact terminal 12 colliding with the bottom of the printed circuit board.

Further, considering the problem of narrowing memory card socket space at memory card insertion, as shown in FIG. 4, the contact terminal 12 must have at least a minimum length in order for the contact terminal 12 to have elasticity, and if a slope is formed on the contact terminal 12 in the direction of card insertion, the collision problem can be resolved. However, because the minimum length, L, of the contact terminal 12 goes outside of the exterior of the housing 11, it is not feasible to mount the contact terminal 12 within the housing 11 due to the inadequate space within the housing 11, and since the exterior lines of the printed circuit board and the housing 11 do not match, it is also difficult to form a solder pattern, so that in practice it has not been possible to configure this structure for a SIM card.

SUMMARY OF THE PRESENT DISCLOSURE

The Present Disclosure is intended to solve the above-described problems. Accordingly, the Present Disclosure has, as one objective, the provision of a micro SIM card socket that, by being manufactured in a "U" shape, resolves both the problem of narrowing installation space due to miniaturization and the problem of collision between the micro SIM card and the contact terminals, and that can ensure sufficient contact force to maintain consistent contact, while also contacting the contact terminal firmly to the micro SIM card connection terminal when the micro SIM card is inserted, even in an ultraslim configuration.

To achieve the above-described objective, the micro SIM card socket of the Present Disclosure comprises: an insulative housing wherein the SIM card is mounted; a metal shell that guides the insertion of the SIM card by coupling with the housing while maintaining a fixed interval from the housing; a plurality of contact terminals that are supported on the housing and contact the connection terminals of the SIM card on one side and are fixed to a printed circuit board on the other side; a SIM card recognition terminal supported on the housing in order to recognize the insertion of the SIM card; and a locking part installed on the side of the housing so as to selectively fix the insertion location of the SIM card. The contact terminal has a "U" shape and the terminal on one side of the contact terminal has a tensioned sloping part elastically pressed against the SIM card end when the SIM card is inserted, and on the end of the tensioned sloping part is formed a contact part that is contacted to the connection terminal of the SIM card.

When inserting the SIM card, if the tensioned sloping part is pressed by the end of the SIM card, the contact terminal is elastically supported on the printed circuit board and also generates a secondary moment, so that the contact part firmly contacts the connection terminal of the SIM card. The tensioned sloping part should preferably be bent at a 30-45° upwards angle from front to back of the housing. The "U"-shaped contact terminal is furnished with a horizontal part that couples to the housing, and a fixing part that fixes to the printed circuit board and is formed bending downward onto one end of the horizontal part. The tensioned sloping part is formed at the other end of the horizontal part, bending upward from front to back of the housing.

As described hereinabove, by manufacturing the contact terminals in a "U" shape, the Present Disclosure resolves both the problem of narrowing installation space due to miniaturization and the problem of collision between the micro SIM card and the contact terminals, and can ensure consistent connectivity between the contact terminals and the SIM card, even in an ultraslim configuration.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

Figure 1:
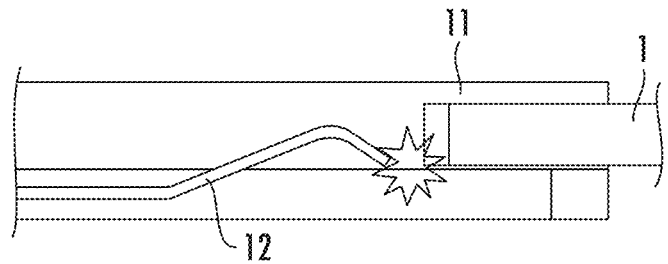
FIGS. 1-3 each illustrate the collision with the contact terminal when inserting a micro SIM card.
Figure 2:
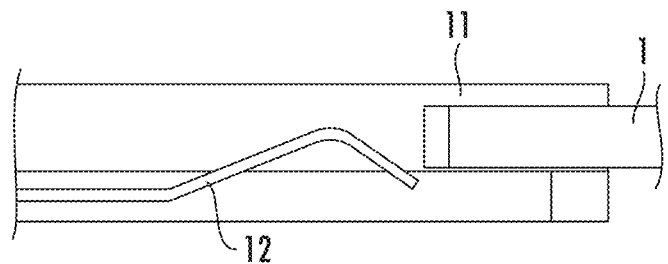
Figure 3:
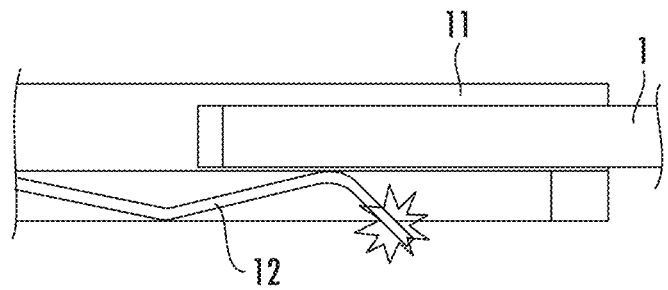
Figure 4:
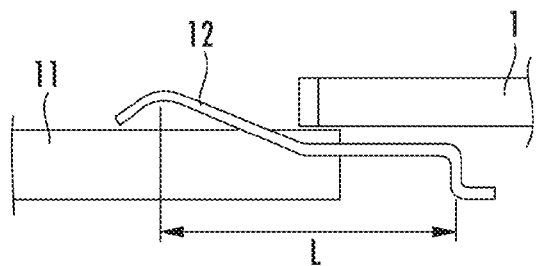
FIG. 4 illustrates the narrow space within the housing of the micro SIM card.
Figure 5:
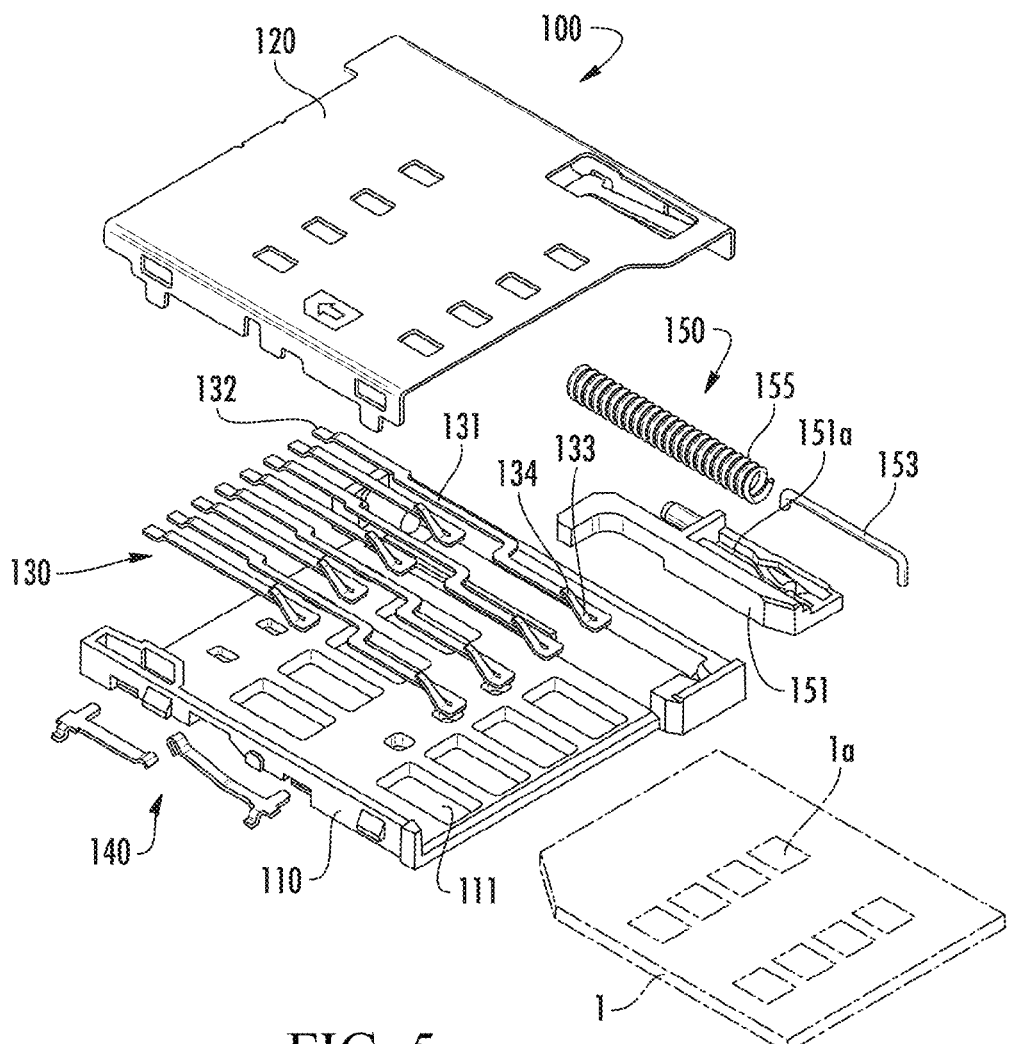
FIG. 5 is an exploded oblique view of a micro SIM card socket of the Present Disclosure.
Figure 6:
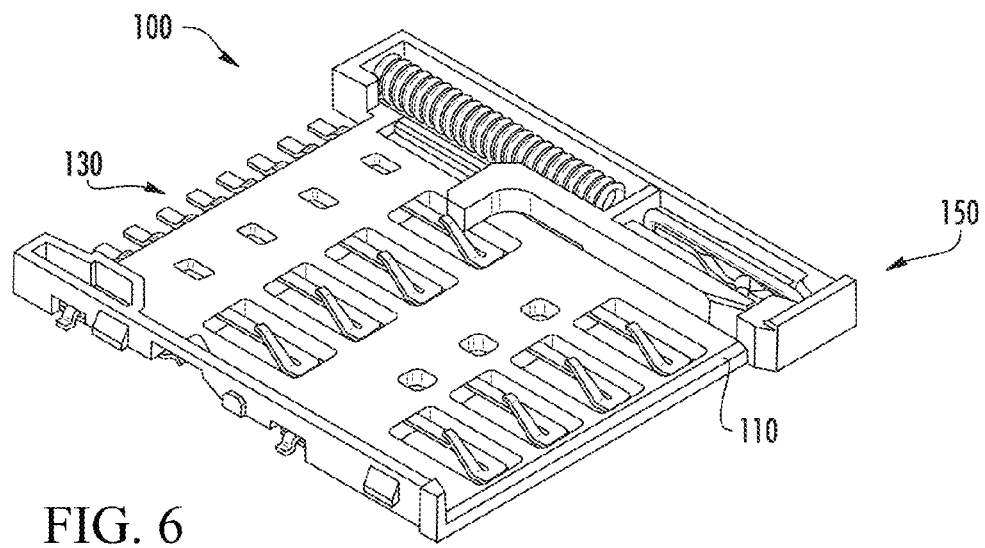
FIG. 6 is an assembled oblique view of the micro SIM card socket of FIG. 5.
Figure 7:
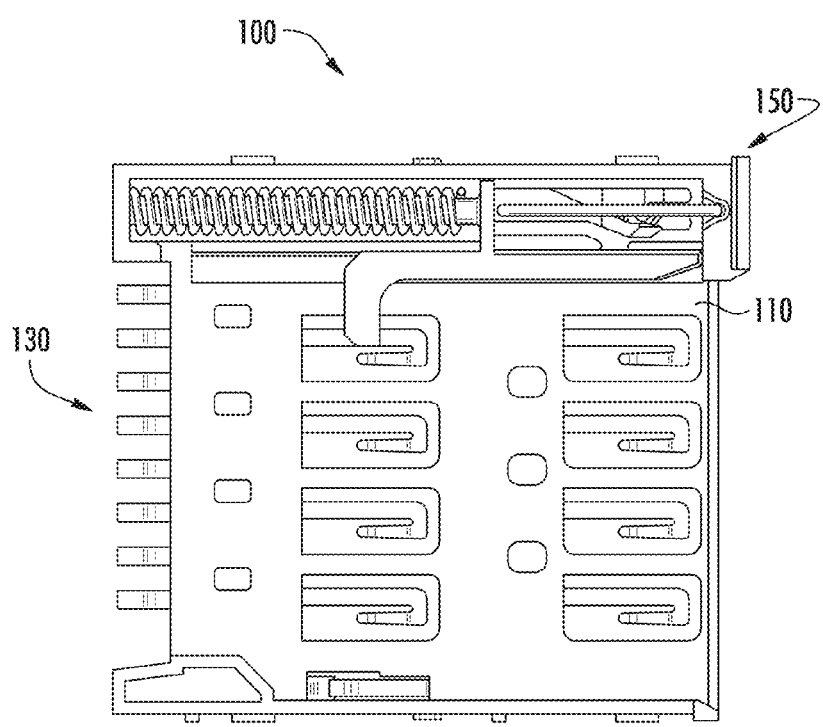
FIG. 7 is a top view of the micro SIM card socket of FIG. 5.
Figure 8:
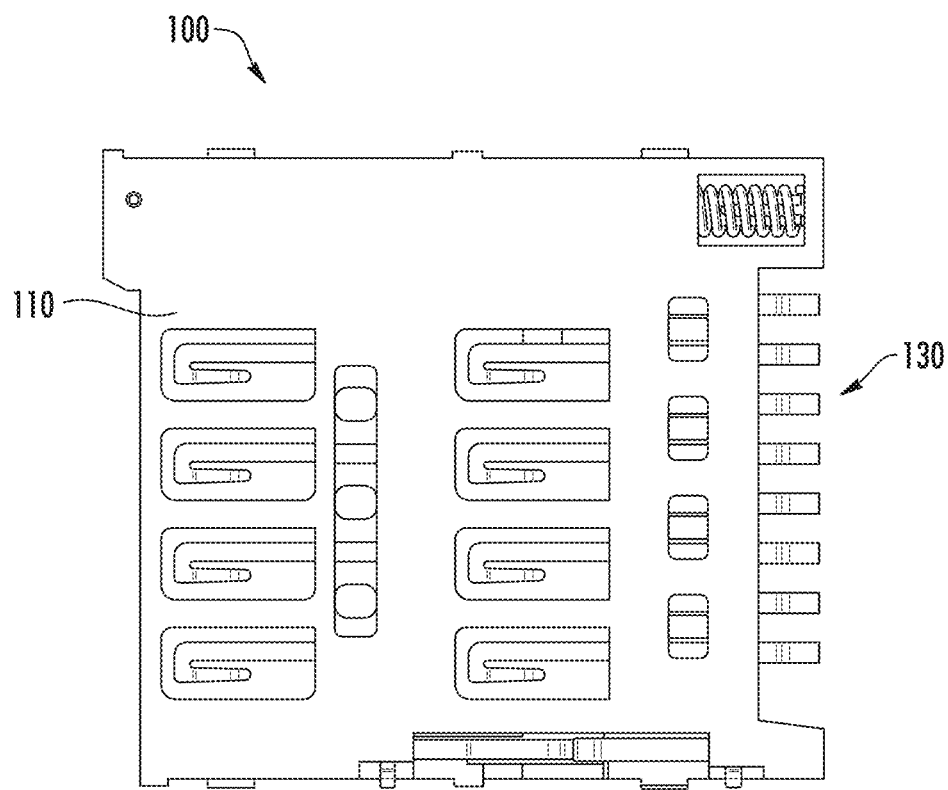
FIG. 8 is a bottom view of the micro SIM card socket of FIG. 5.
Figure 9:
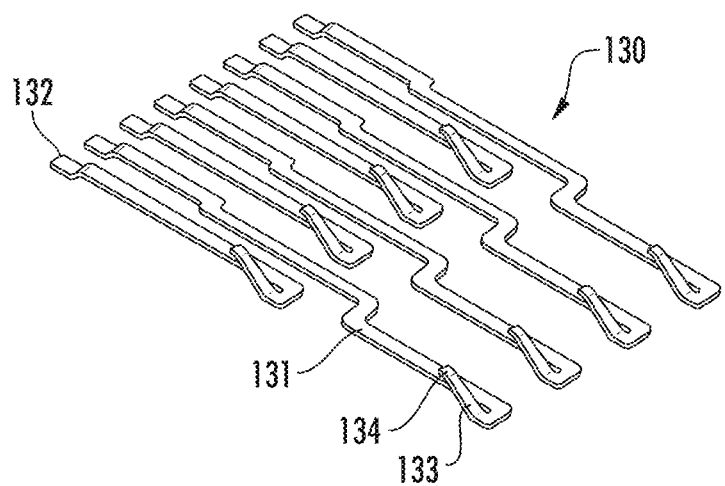
FIG. 9 is an oblique view showing contact terminals according to the Present Disclosure.

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to FIGS. 5-10, the micro SIM card socket 100 of the Present Disclosure is furnished with: an insulative housing 110 whereto the micro SIM card 1 is mounted; a metal shell 120 that guides the insertion of the micro SIM card 1 by coupling with the housing 110 while maintaining a fixed interval from the housing 110; a plurality of contact terminals 130 supported on the housing 110, and that contact the connection terminals 1*a* of the micro SIM card 1 on one side and are fixed to a printed circuit board (not shown) on the other side; a micro SIM card recognition terminal 140 supported on the housing 110 in order to recognize the insertion of the micro SIM card 1; and a locking part 150 installed on the side of the housing 110 to selectively fix the insertion location of the micro SIM card 1.

The housing 110 comprises an insulator, such as a conventional plastic. On the bottom surface, a plurality of grooves 111 are formed to prevent interference with the connection terminals 1*a* in the event of elastic deformation of the connection terminals 1*a*. The metal shell 120 guides the insertion of the micro SIM card 1 and is formed of a conventional metal material. The contact terminal 130 is intended to connect electrically with the micro SIM card 1 and printed circuit board 8. Contact terminals 130 are positioned in sequence, and 4 tensioned sloping parts 133, described below, are deployed to the front and back.

With regard to the shape of the contact terminals 130, the contact terminals 130 have a rough "U" shape. Somewhat more specifically, the contact terminals 130 respectively comprise: a horizontal part 131 coupled to the housing 110; a fixed part (weld part) 132 fixed to the printed circuit board and is formed bending downward on one side of the horizontal part 131; a tensioned sloping part 133 formed bending upward from the front to the rear of the housing 110, on the other side of the horizontal part 131; and a contact part 134 formed extending from the tensioned sloping part 133.

The tensioned sloping parts 133 are pressed elastically to the rear end of the micro SIM card 1 when the micro SIM card 1 is inserted. The contact part 134 is contacted elastically to the connection terminal 1*a* of the micro SIM card 1.

When the micro SIM card 1 is inserted, if the tensioned sloping part 133 is pressed by the rear end of the micro SIM card 1, a secondary moment is generated while the horizontal part 131 of the contact terminal 130 is supported elastically on the printed circuit board. In this case, the contact part 134 of the contact terminal 130 is configured to as to contact firmly to the connection terminal 1*a* of the micro SIM card 1. Here, it is preferable that the tensioned sloping part 133 be bent 30-45° from the front to the rear of the housing 110.

The locking unit 150 comprises: a heart cam 151 having a heart-shaped guide groove 151*a* and installed to enable sliding motion together with the SIM card 1 along the guide groove 151*a* within the side of the housing 110; a pin rod 153 that fixes the position of the micro SIM card 1 while moving along the guide groove 151*a*; and a spring 155 that elastically supports the heart cam 151.

Figure 10:
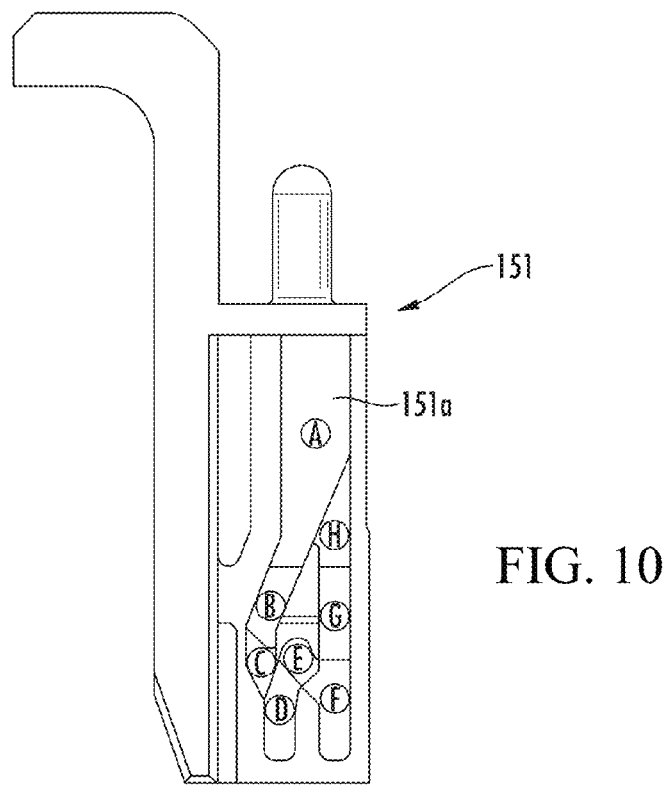
FIG. 10 is a top view of the heart cam.

As shown in FIG. 10, the end of the pin rod 153 is inserted into the heart-shaped guide groove 151*a*, and when the heart cam 151 is moved by the motion of the micro SIM card 1, the end of the pin rod 153 is cycled through positions A→B→C→D→E→F→G→H→A of the guide groove 151*a*, moving the micro SIM card 1 from the separation position (unlocking) to the insertion position (locking) and back to the separation position (unlocking).

In operation, the micro SIM card 1 is inserted into the insulative housing 110 by pressure. The metal shell 120 then acts to guide the insertion of the micro SIM card 1. The heart cam 151 then is supported elastically on the spring 155, and the end of the pin rod 153 moves through positions A→B→C→D→E of the guide groove 151*a*, moving the micro SIM card 1 from separation position to insertion position.

When the micro SIM card 1 is then inserted, if the tensioned sloping part 133 is pressed by the rear end of the micro SIM card 1, a secondary moment is generated while the horizontal part 131 of the contact terminal 130 is supported elastically on the printed circuit board. The contact part 134 of the contact terminal 130 is firmly contacted to the connection terminal 1*a* of the micro SIM card 1. If the micro SIM card 1 is pressed once more, the end of the pin rod 153 is moved through positions E→F→G→H→A of the guide groove 151*a*, so that the micro SIM card 1 is returned to the separation position.

Figure 11:
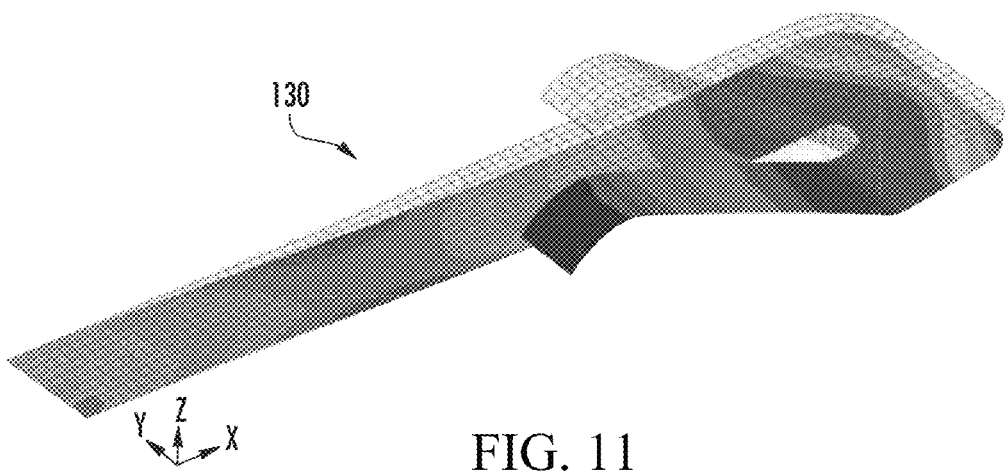
FIG. 11 illustrates the contact force and plastic deformation at maximum and minimum contact of the contact terminals according to the Present Disclosure.

As shown in FIG. 11, at maximum contact of the contact terminal 130 according to the Present Disclosure, the contact force was measured at 0.62 N/Pin, and the plastic deformation at 0.035 mm. At minimum contact of the contact terminal 130 according to the Present Disclosure, the contact force was measured at 0.38 N/Pin, and the plastic deformation at 0.0023 mm. The contact terminal 130 according to the Present Disclosure generates a secondary moment while being elastically supported on the printed circuit board, thus enabling the contact part 134 of the contact terminal 130 to be firmly contacted to the connection terminal 1a of the micro SIM card 1, enabling both microminiaturized and ultraslim configurations.

As described above, by being produced in a "U" shape, the Present Disclosure resolves both the problem of narrowing installation space due to miniaturization and the problem of collision between the front end of the card and the contact terminals, and can ensure consistent connectivity between the contact terminals and the micro SIM card when the micro SIM card has been inserted, even in an ultraslim configuration.

While a preferred embodiment of the Present Disclosure is shown and described, it is envisioned that those skilled in the art may devise various modifications without departing from the spirit and scope of the foregoing Description and the appended Claims.

What is claimed is:

1. A micro SIM card socket, the micro SIM card socket comprising:

an insulative housing and a metal shell supported by the housing, the metal shell and housing cooperatively defining a card-receiving slot for a micro SIM card, the housing further including a plurality of terminal-receiving cavities disposed therein within the housing card-receiving slot; and a plurality of first and second conductive terminals extending lengthwise in the housing, each of the first and second terminals including a tail portion and a contact portion interconnected by an intervening horizontal body portion, the terminal tail portions being configured for mounting to a printed circuit board, the terminal contact portions being disposed in the terminal-receiving cavities, and the terminal horizontal body portions being coupled to the housing such that the terminal contact portions can deflect under pressure of a micro SIM card inserted into the card-receiving slot;

wherein the first terminals have a first length and the second terminals have a second length, the first length being greater than the second length, the first terminal horizontal body portions including a widthwise offset and the second terminals extending lengthwise within the first terminal horizontal body portion offsets, front ends of the terminal body portions of the first and second terminals having a U-shaped configuration in a horizontal plane when viewed from above and at least partially defining the terminal contact portions, the terminal contact portions including sloped portions that extend upward in a front to rear direction with respect to the housing and which terminate in contact ends of the terminals.

2. The micro SIM card socket of claim 1, wherein the sloped portions extend upwardly from the first and second terminal horizontal body portions at an angle of between 30 degrees to 45 degrees.

3. The micro SIM card socket of claim 1, wherein the terminal contact ends of the first and second terminals deflect downwardly into areas adjacent their respective first and second terminal horizontal body portions, when contacted by a micro SIM card inserted into the card-receiving slot.

4. The micro SIM card socket of claim 3, wherein the first and second terminal contact ends deflect with colliding with an insertion of a micro SIM card inserted into the card-receiving slot.

5. The micro SIM card socket of claim 3, wherein downward deflection of the first and second terminal contact ends generate respective secondary moments in the first and second terminal horizontal body portions.

6. The micro SIM card socket of claim 1, wherein each second terminal is paired with a first terminal.

7. The micro SIM card socket of claim 1, wherein each second terminal is disposed between two adjacent first terminals.

8. The micro SIM card socket of claim 1, wherein the terminal horizontal body portions and the sloped portions define adjacent legs of each U-shaped configuration.

9. The micro SIM card socket of claim 1, wherein parts of the first terminal horizontal body portions are aligned lengthwise with the second terminal body portions.

* * * * *